(12) United States Patent
Hwang et al.

(10) Patent No.: US 12,128,544 B2
(45) Date of Patent: Oct. 29, 2024

(54) SERVICE ROBOT SYSTEM AND METHOD FOR OPERATING THE SAME

(71) Applicants: Hyundai Motor Company, Seoul (KR); Kia Corporation, Seoul (KR)

(72) Inventors: Sang Hyun Hwang, Seoul (KR); Il Yong Yoon, Seoul (KR); Eun Ji Kim, Gunpo-si (KR); Si Hyun Joo, Seoul (KR); Gil Jin Yang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 280 days.

(21) Appl. No.: 17/847,508

(22) Filed: Jun. 23, 2022

(65) Prior Publication Data

US 2023/0202049 A1   Jun. 29, 2023

(51) Int. Cl.
*B25J 11/00* (2006.01)

(52) U.S. Cl.
CPC .................................. *B25J 11/008* (2013.01)

(58) Field of Classification Search
CPC ..... B25J 11/008; B25J 9/1661; G05B 19/042; G05B 2219/45084; G05D 1/0088
See application file for complete search history.

(56) References Cited

U.S. PATENT DOCUMENTS

| | | | |
|---|---|---|---|
| 6,526,332 B2 | 2/2003 | Sakamoto et al. | |
| 6,760,648 B2 | 7/2004 | Sakamoto et al. | |
| 8,364,310 B2 | 1/2013 | Jones et al. | |
| 8,505,022 B2 * | 8/2013 | Helander | G06F 9/50 703/22 |
| 8,751,042 B2 | 6/2014 | Lee et al. | |
| 9,636,822 B2 | 5/2017 | Song et al. | |
| 11,717,959 B2 * | 8/2023 | Jang | G06N 3/084 700/253 |
| 2002/0173879 A1 | 11/2002 | Sakamoto et al. | |
| 2003/0139850 A1 | 7/2003 | Sakamoto et al. | |
| 2013/0138596 A1 | 5/2013 | Kim et al. | |
| 2015/0183112 A1 | 7/2015 | Song et al. | |

(Continued)

FOREIGN PATENT DOCUMENTS

| | | | |
|---|---|---|---|
| JP | 2002113675 A | 4/2002 | |
| JP | 2019058978 A | 4/2019 | |

(Continued)

OTHER PUBLICATIONS

Lee et al., An intelligent service-based network architecture for wearable robots, 2004, IEEE, p. 1874-1885 (Year: 2004).*

(Continued)

*Primary Examiner* — McDieunel Marc
(74) *Attorney, Agent, or Firm* — SLATER MATSIL, LLP (57) ABSTRACT

An embodiment device for controlling a service robot includes a communication device configured to communicate with the service robot and a controller configured to detect a present situation of the service robot by using various pieces of sensor information acquired from the service robot, determine a task appropriate to the present situation of the service robot, wherein the task includes one or more behaviors, and control the service robot based on an action set for each of the one or more behaviors of the task.

20 Claims, 5 Drawing Sheets

(56) References Cited

U.S. PATENT DOCUMENTS

2022/0126445 A1\* 4/2022 Zhu .................. B25J 9/1635
2022/0306152 A1\* 9/2022 Zhang ............. B60W 30/18159

FOREIGN PATENT DOCUMENTS

KR  101190660 B1  10/2012
KR  20130057628 A   6/2013

OTHER PUBLICATIONS

Rembold; et al., From autonomous assembly robots to service robots for factories, 2002, IEEE, p. 2160-2167 (Year: 2002).\*
Bischoff et al., HERMES—a versatile personal robotic assistant, 2004, IEEE, p. 1759-1779 (Year: 2004).\*
Graefe et al., Three types of learning robots, 2004, IEEE, p. 683-688 (Year: 2004).\*

\* cited by examiner

SERVICE ROBOT SYSTEM AND METHOD FOR OPERATING THE SAME

CROSS-REFERENCE TO RELATED APPLICATIONS

This application claims the benefit of Korean Patent Application No. 10-2021-0187799, filed on Dec. 24, 2021, which application is hereby incorporated herein by reference.

TECHNICAL FIELD

The present disclosure relates a service robot system and a method for operating the same.

BACKGROUND

In general, the solution of a robot may be specifically designed and implemented specially, depending on the type of the robot and the environment of the robot. Although the solution of the robot is rapidly and efficiently applicable to a special target situation, the application range of the solution of the robot is significantly limited to a specific application range. Accordingly, even if the application range of the solution or the environment is slightly changed, the existing solution may not be utilized. Accordingly, a novel solution should be designed and implemented.

In particular, according to the software architecture of the service robot, a scenario implementing unit of the robot and a functional unit of the robot deeply depend on each other. Accordingly, it is difficult to apply a novel scenario to the robot or to change the existing scenario. For reference, the service robot is referred to as a robot developed to be in place of the labor of a human being and to enhance the quality of life, and the robot autonomously operates by recognizing and determining an external environment. Recently, the development of intelligent service robots has been actively performed to replace labor costs, respond to aging, and enhance industrial competitiveness. As the scope of application of such a service robot is gradually expanded to home, welfare, education, entertainment, medical care, and defense social safety, there is an increasing demand for scenario development and change.

Accordingly, even if a user arbitrarily changes the scenario of the robot by implementing a software architecture having the lower dependence between the scenario implementing unit of the robot and the function unit of the robot, a manner in which the functional unit of the robot normally operates has been required.

The matter described in the background section is made for the convenience of explanation, and may include matters other than a related art known to those skilled in the art.

SUMMARY

The present disclosure relates a service robot system and a method for operating the same. Particular embodiments relate to a software architecture capable of facilitating the change of various scenarios applied to a service robot.

Embodiments of the present disclosure can solve problems occurring in the prior art while advantages achieved by the prior art are maintained intact.

An embodiment of the present disclosure provides a service robot system and a method for operating the same in which various scenarios applied to a service robot may be easily changed, and the service robot may be normally operated even if a scenario is changed by a user, by providing an editing function for the various scenarios, which are applied to the service robot, to the user, determining a task appropriate to a situation of the service robot, and performing a behavior corresponding to the task and an action corresponding to the behavior, through the interaction among a task planner, a behavior manager, and an action arbiter.

The technical problems to be solved by embodiments of the present disclosure are not limited to the aforementioned problems, and any other technical problems not mentioned herein will be clearly understood from the following description by those skilled in the art to which the present disclosure pertains. In addition, it will be easily understood that the objects and advantages of embodiments of the present disclosure are realized by means and combinations described in the appended claims.

The technical problems to be solved by embodiments of the present disclosure are not limited to the aforementioned problems, and any other technical problems not mentioned herein will be clearly understood from the following description by those skilled in the art to which the present disclosure pertains.

According to an embodiment of the present disclosure, a device for controlling a service robot may include a communication device to make communication with the service robot, and a controller to detect a present situation of the service robot by using various pieces of sensor information acquired from the service robot, determine a task appropriate to the present situation of the service robot, and control the service robot based on an action set for each of behaviors constituting the task.

According to an embodiment of the present disclosure, the controller may provide an editing function for a scenario applied to the service robot.

According to an embodiment of the present disclosure, the controller may generate a behavior list corresponding to each task and match at least one action to the behavior on the behavior list, for the editing function for the scenario.

According to an embodiment of the present disclosure, the service robot may include the action arbiter to actually drive the service robot in conjunction with a hardware ablation layer (HAL).

According to an embodiment of the present disclosure, the action arbiter may include an action repository to store actions constituting the behavior.

According to an embodiment of the present disclosure, the controller may include a task repository to store a behavior list corresponding to each task, a task planner to determine a task corresponding to a present situation of the service robot and search the task repository for the behavior list corresponding to the task, and a behavior manager to transmit, to the action arbiter, an action set corresponding to the behavior received from the task planner.

According to an embodiment of the present disclosure, the task planner may transmit a next behavior to the behavior manager, after determining that the behavior transmitted to the behavior manager is performed by the service robot.

According to an embodiment of the present disclosure, the behavior manager may transmit, to the action arbiter, an action set for the next behavior, after determining that the action set corresponding to the behavior received from the task planner is performed by the service robot.

According to an embodiment of the present disclosure, the behavior manager may adjust the synchronization between actions included in the action set.

According to an embodiment of the present disclosure, the action arbiter may drive the service robot, based on the action set received from the behavior manager.

According to another embodiment of the present disclosure, a method for controlling a service robot may include acquiring, by a controller, various pieces of sensor information from the service robot, detecting, by the controller, a present situation of the service robot by using the various pieces of sensor information, determining, by the controller, a task appropriate to the present situation of the service robot and controlling the service robot based on an action set for each of behaviors constituting the task.

According to an embodiment of the present disclosure, the method may include providing, by the controller, an editing function for a scenario applied to the service robot.

According to an embodiment of the present disclosure, the method may include generating a behavior list corresponding to each task and matching at least one action to each behavior on the behavior list.

According to an embodiment of the present disclosure, the method may include determining, by a task planner, which includes a task repository to store a behavior list corresponding to each task, a task corresponding to a present situation of the service robot, searching the task repository for the behavior list corresponding to the task, and transmitting the behavior on the behavior list to a behavior manager, and transmitting, by the behavior manager, to the action arbiter, an action set corresponding to the behavior received from the task planner.

According to an embodiment of the present disclosure, the method may include transmitting, by the task planner, a next behavior to the behavior manager, after determining that the behavior transmitted to the behavior manager is performed by the service robot.

According to an embodiment of the present disclosure, the method may include transmitting, by the behavior manager, an action set for the next behavior to the action arbiter, after determining that the action set corresponding to the behavior received from the task planner is performed by the service robot.

According to an embodiment of the present disclosure, the method may include adjusting the synchronization between actions included in the action set.

According to an embodiment of the present disclosure, the method may include driving the service robot, based on the action set received from the behavior manager.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, some embodiments of the present disclosure will be described in detail with reference to the accompanying drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In addition, in the following description of components according to embodiments of the present disclosure, the terms 'first', 'second', 'A', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined in the present application.

Figure 1:
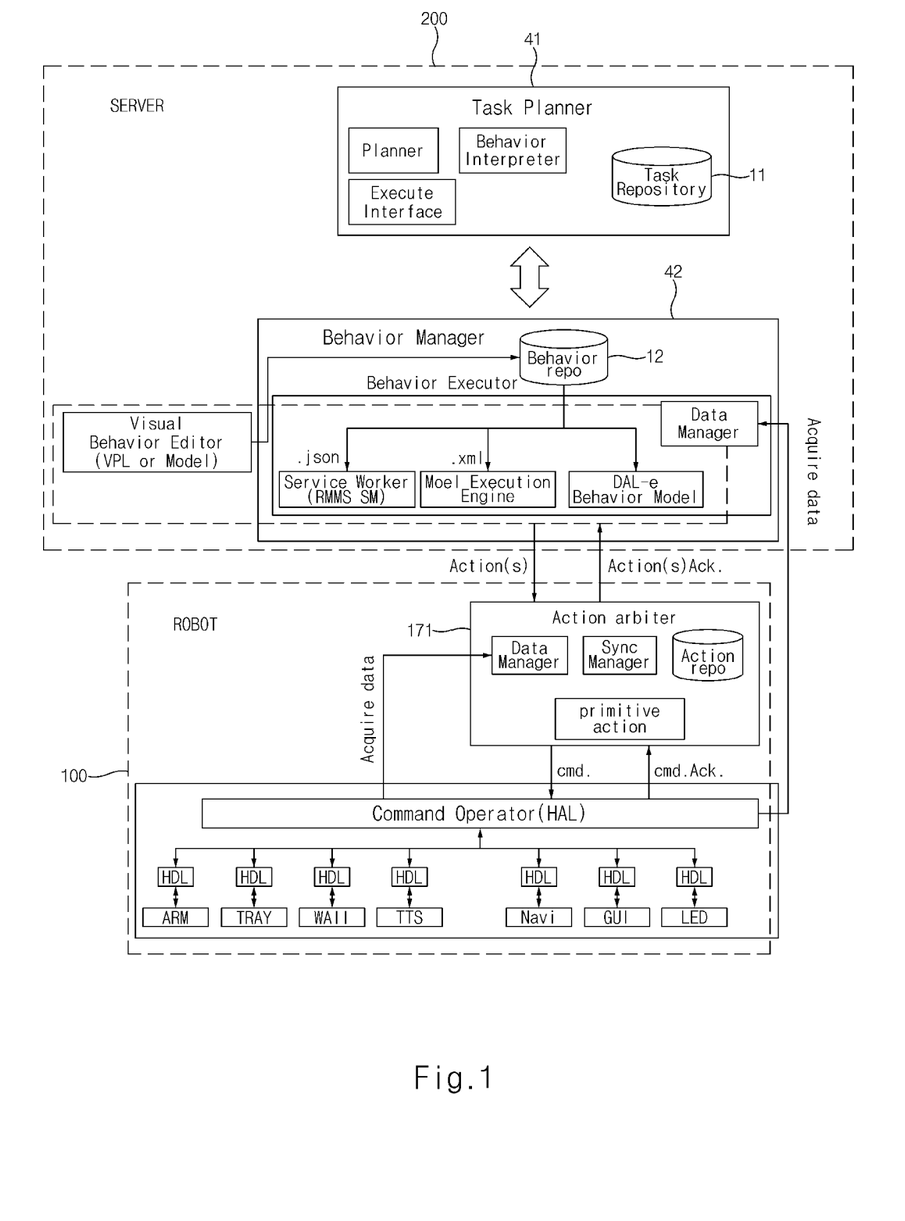
FIG. 1 is a view illustrating a software architecture of a service robot system, according to an embodiment of the present disclosure.

FIG. 1 is a view illustrating a software architecture of a service robot system, according to an embodiment of the present disclosure. Although the following description will be described in that a task planner 41 and a behavior manager 42 are implemented in a server, the task planner 41 and the behavior manager 42 may be implemented in a service robot 100, according to another embodiment.

As illustrated in FIG. 1, according to an embodiment of the present disclosure, the software architecture of the service robot system may include the task planner 41, the behavior manager 42, and an action arbiter 171.

First, the task planner 41 and the behavior manager 42 are included in the software architecture provided in the server. One processor may be implemented to perform both the function of the task planner 41 and the function of the behavior manager 42. Alternatively, a first processor may be implemented to perform the function of the task planner 41 and a second processor may be implemented to perform the function of the behavior manager 42.

The task planner 41 may acquire various pieces of sensor information from a sensor 120 provided in the service robot 100, detect a situation of the service robot 100 based on the sensor information, and determine a task appropriate to the detected situation of the service robot 100. In this case, the task may include a vehicle guiding task (RequestCarExplain), a charging task (RequestChargeService), a charging undocking task (ChargingWakeup), a mute service task (MuteService), a waiting service task (WaitService), a charging docking task (AutoDocking), and a booting task (ServiceStart).

The task planner 41 may provide a communication interface with a user terminal 300, and may generate a behavior list for each task, in response to a request from the user terminal 300. The behavior list for each task generated may be stored in a task repository 11. For example, a behavior set for the booting task (ServiceStart) may include "AtomicChangeScreen" for allowing the service robot 100 to display a booting screen, "ServiceStaffAuth" allowing the service robot 100 to perform authentication, "RobotInitLocalization" for measuring a preset position of the service robot 100, and "RequestServiceReady" for allowing the service robot 100 to stand by.

The task planner 41 determines a task corresponding to a present situation of the service robot 100, searches the task repository 11 for a behavior list corresponding to the task, and sequentially transmits each behavior on the behavior list to the behavior manager 42. In this case, when finishing the behavior received from the task planner 41, the behavior manager 42 transmits a behavior finish message to the task planner 41. When receiving the behavior finish message from the behavior manager 42, the task planner 41 transmits a next behavior to the behavior manager 42. In this case, the task planner 41 may dynamically change each behavior on the behavior list, based on a situation, and may shift from the behavior list to another behavior list.

The task planner 41 may interpret a plurality of behaviors stored in a behavior repository 12 to extract information on each behavior. In this case, the behavior repository 12 may store an action set corresponding to each behavior.

The behavior manager 42 may have a behavior interpreter to selectively utilize various behavior models, and may provide a visual behavior editing function to a user. In this case, various behavior models may be stored in the behavioral repository 12.

The behavior manager 42, which is a module to control the service robot 100 based on a scenario, transmits an action set corresponding to the behavior received from the task planner 41 to the action arbiter 171. In this case, the behavior manager 42 may adjust the synchronization between actions included in the action set. For example, the action set for "AutoDockingBehavior" may be implemented as shown in the following Table 1.

TABLE 1

[{"action": ["ChangeScreenAction",
"AutoDockingAction"], "delay": 10, "success":
done, "fail"; next},
{"action": ["TTSAction"], "delay": 10},
{"action": ["AutoDockingAction"], "delay": 10,
"success": done, "fail"; next},
{"action": ["TTSAction"], "delay": 10},
{"action": ["AutoDockingAction"], "delay":
10, "success": done, "fail"; next},
{"action": ["TTSAction"], "delay": 10},
{"action": ["AutoDockingAction"], "delay": 10,
"success": done, "fail"; next}]

In Table 1, an action set grouped by a square bracket represents an auto-docking behavior, and a bracket represents each action for the auto-docking behavior. For example, the first action is simultaneously performing "ChangeScreenAction" and "AutoDockingAction". When the first action is successful after 10 seconds, the first action finished is notified to the behavior manager 42 (ActionAck). When the first action is failed, transition is made to a next action.

When the action set corresponding to the behavior received from the task planner 41 is finished by the action arbiter 171, the behavior manager 42 notifies that the action set is finished to the task planner 41, receives an action set corresponding to a next behavior from the task planner 41, and transmits the action set corresponding to the next behavior to the action arbiter 171.

The action arbiter 171, which is a module installed on the service robot 100, actually drives the service robot 100 in conjunction with a hardware ablation layer (HAL). In this case, the action arbiter 171 may include an action repository, and the action repository may store actions for each behavior constituting the task. For example, the actions may include "ChangeScreenAction" for changing a screen, "TTSAction" for outputting a text in the form of voice, "MediaWallCtrlAction" for controlling a media wall, "AutoDockingAction" for performing auto-docking, "FillInfoAction" for inputting a GUI touch, and "NLAction" for receiving a sound.

The action arbiter 171 may have a primitive action for driving the service robot 100.

For reference, "HAL" indicates an abstraction layer between hardware of the service robot 100 and software of the service robot 100, and hardware description language (HDL), which is a language describing the hardware, may be used to accurately describe an electronic circuit.

Figure 2:
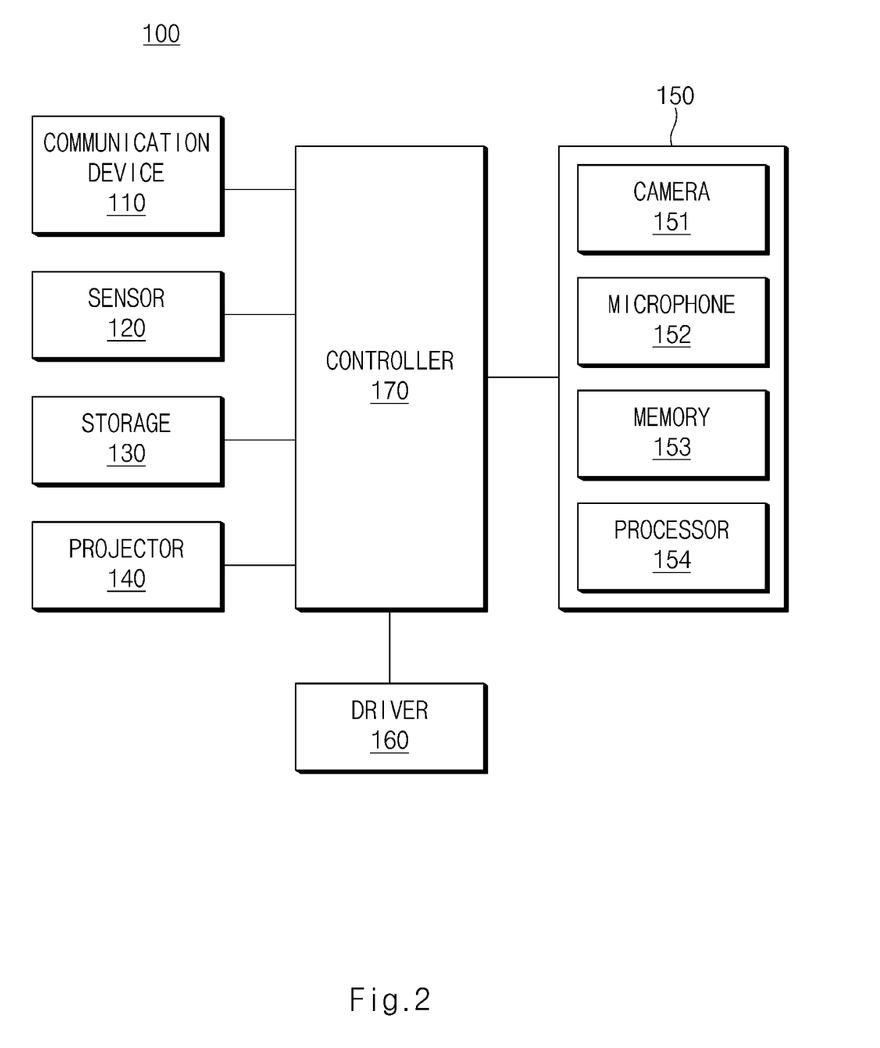
FIG. 2 is a block diagram of a service robot, according to an embodiment of the present disclosure.

FIG. 2 is a block diagram illustrating a service robot, according to an embodiment of the present disclosure. The service robot guides an exhibition vehicle and makes an explanation.

As illustrated in FIG. 2, the service robot 100 according to an embodiment of the present disclosure may include a communication device 110, the sensor 120, a storage 130, a projector 140, a monitor 150, a driver 160, and a controller 170.

The communication device no exchanges data with an electronic device (e.g., an electronic tag, a vehicle terminal, a smartphone, and a server) connected to a wireless communication network.

The communication device 110 receives identification information transmitted from each exhibition vehicle. For example, the communication device 110 receives tag information transmitted from an electronic tag attached to a vehicle (hereinafter, a target vehicle) to be described among vehicles exhibited in an exhibition hall. In this case, the tag information may include identification information (e.g., a vehicle number, a vehicle type, and a vehicle model) of the target vehicle.

The sensor 120 detects a surrounding object of the service robot (hereinafter, referred to as a robot) 100 and measures a present position of the service robot 100 and a present position of the surrounding object. In addition, the sensor 120 acquires visual information, auditory information, and tactile information around the robot 100. The sensor 120 may include a distance sensor, an inertial sensor, an active beacon sensor, an image sensor, a tactile sensor, and an audible sensor.

The distance sensor measures a distance between the robot 100 and the target vehicle (the surrounding object). The distance sensor may be implemented with at least one of sensors, such as a radio detecting and ranging (radar) and an ultrasonic sensor.

The inertial sensor measures the acceleration and the angular velocity of the robot 100, when the robot wo moves, and includes an angular velocity sensor and an acceleration sensor. The acceleration and the angular velocity measured by the inertial sensor are used to recognize the present position and the posture of the robot 100.

The active beacon sensor is a sensor used to estimate the position of the robot 100, together with the inertial sensor. In particular, the active beacon sensor is mainly used to estimate the position of the robot wo and the position of the target vehicle, indoors. The active beacon sensor may estimate the position of the robot 100 or the position of the target vehicle by calculating a time taken until an ultrasonic wave is returned after being generated. The active beacon sensor and the inertial sensor may be collectively referred to as a position estimating sensor.

The image sensor acquires the surrounding image of the robot 100 or the image of the target vehicle. The image sensor may be implemented with at least one of sensors, such as a charge coupled device (CCD) image sensor, a complementary metal oxide semi-conductor (CMOS) image sensor, a charge priming device (CPD) image sensor, and a charge injection device (CID) image sensor.

The tactile sensor, which is to sense the tactile of the robot 100, recognizes external contact stimulation. The tactile sensor may include a touch sensor, a pressure sensor, and/or a force sensor.

An auditory sensor senses an external sound signal. A microphone (sound sensor) may be used as the auditory sensor.

The storage 130 stores information such as vehicle specification information, vehicle silhouette information, each appropriate position of the projection for each vehicle part, and vehicle projection information for each vehicle model, in a database form. The vehicle silhouette information includes length information and tire position information in four directions of the front, rear, and side surfaces of the vehicle.

In addition, the storage 130 stores a lane width and reference information on a parking space in the Road Traffic Act. The storage 130 may store a robot control algorithm, a position estimating algorithm, an image processing algorithm, and an image comparing algorithm.

The projector 140 outputs visual information (projection image) stored in the storage 130 to a projection position. The projector 140 is connected with an actuator to adjust the angle (tilt) and rotation (roll, pitch, or yaw) of the projector 140 to output the projection image to a desired projection position. The actuator operates under the control of the controller 170.

The monitor 150 monitors the state of a user, that is, a visitor viewing the displayed vehicle. The monitor 150 includes a camera 151, a microphone 152, a memory 153, and a processor 154.

The camera 151 acquires an image of a user. The camera 151 may include at least one of sensors, such as a charge-coupled device (CCD) image sensor, a complementary metal oxide silicon (CMOS) image sensor, a charge priming device (CPD) image sensor, and a charge-injection device (CID) image sensor.

The microphone 152 receives an external sound signal from the outside through a microphone and processes the received sound signal as electrical voice data (voice signal). The microphone 152 may be implemented with a noise removing algorithm for removing noise generated when the voice signal is received from the outside.

The memory 153 may store a program for an operation of the processor 154 and temporarily store input/output data. The memory 153 stores an image processing and analyzing algorithm, a gaze recognizing algorithm, and a voice recognizing algorithm.

The processor 154 controls the overall operation of the monitor 150. The processor 154 may include at least one of an application specific integrated circuit (ASIC), a digital signal processor (DSP), a programmable logic device (PLD), field programmable gate arrays (FPGAs), a central processing unit (CPU), microcontrollers, or microprocessors.

The processor 154 analyzes a user image obtained through the camera 151 to determine the state of a user. In this case, the state of the user includes information on a gaze, a gaze stay time, a gaze position, head movement, and whether the user gets in the vehicle.

The processor 154 analyzes the voice signal of the user input through the microphone 152 and converts the voice signal into words or a sentence through a voice recognition technology. The processor 154 recognizes the voice of the user and transmits a result of voice recognition to the controller 170.

The driver 160 controls the movement of the robot 100 in response to the instruction of the controller 170. In other words, the driver 160 includes an actuator to control the movement (driving) or rotation of the robot 100.

The controller 170 controls the overall operation of the robot 100. The controller 170 includes a processor and a memory (e.g., ROM, RAM, EEPROM) to store a program allowing the processor to perform a specific operation. The processor may be implemented with at least one of an application specific integrated circuit (ASIC), a digital signal processor (DSP), a programmable logic device (PLD), a field programmable gate array (FPGA), a central processing unit (CPU), a micro-controller, or a micro-processor.

The controller 170 may have the action arbiter 171, which is a software module installed therein, and may control the operation of the robot 100, in response to a control command (e.g., an action set) received from the behavior manager 42 installed in the server. For example, when the user (guide) controls the robot 100 through a controller installed on the smartphone, the controller 170 receives a control command transmitted from the smartphone through the communication device 110, and controls the operation of the robot 100 in response to the received control command.

Meanwhile, the controller 170 may recognize a voice command of the user through the sensor 120 or the monitor 150, and may control the operation of the robot 100 in response to the recognized voice command. For example, when the controller 170 recognizes a user voice command of "start of guidance" through the microphone 152 of the monitor 150, the controller 170 starts guiding the exhibition vehicle.

The controller 170 may control the driver 160, based on the movement path stored in the storage 130 to move the robot 100. In other words, the controller 170 guides a visitor to the target vehicle to be described along a specific movement path. Meanwhile, the controller 170 may recognize the movement path of the visitor through the monitor 150 and may move the robot 100 along the recognized movement path.

The controller 170 recognizes the target vehicle of the exhibition vehicles. The controller 170 determines the position of the target vehicle by reading an electronic tag or a physical tag attached to the target vehicle. The controller 170 controls the driver 160 to move the robot 100 to the position of the target vehicle.

When the movement to the position of the target vehicle is finished, the controller 170 reads information on the target vehicle from the storage 130 and guides the visitor (user). The controller 170 may convert information (target vehicle information) about the target vehicle into a voice signal using a text to speech (TTS) application and may output the voice through a speaker (not illustrated). In this case, the information on the target vehicle may be stored in the form of voice data. In this case, the controller 170 reproduces the target vehicle information, which is voice data, and outputs the voice data to the speaker.

The controller 170 proposes a visual information service to the user (visitor) while explaining the target vehicle based on the target vehicle information. In other words, when an additional visual explanation function is included in the description content of the target vehicle, the controller 170 may propose providing the additional explanation to the user.

The controller 170 waits for a response from the user (visitor) for a specific time after the visual information service is proposed. The controller 170 may receive a user response through the monitor 150. The controller 170 analyzes the user gaze or the user head movement through the monitor 150 to determine whether to accept the service proposal. Alternatively, the controller 170 recognizes the user voice input through the microphone 152 of the monitor 150 and determines whether the service proposal is accepted. Meanwhile, the controller 170 may determine whether the service proposal is accepted, depending on the user input through an input/output device, such as a touch screen.

The controller 170 projects and outputs visual information depending on whether the user accepts the service proposal. When the user does not accept the service proposal, the controller 170 makes the next explanation about the target vehicle without the additional visual explanation, and when the user accepts the service proposal, the controller 170 aligns the robot 100 based on the target vehicle and adjusts (controls) the distance.

Figure 3:
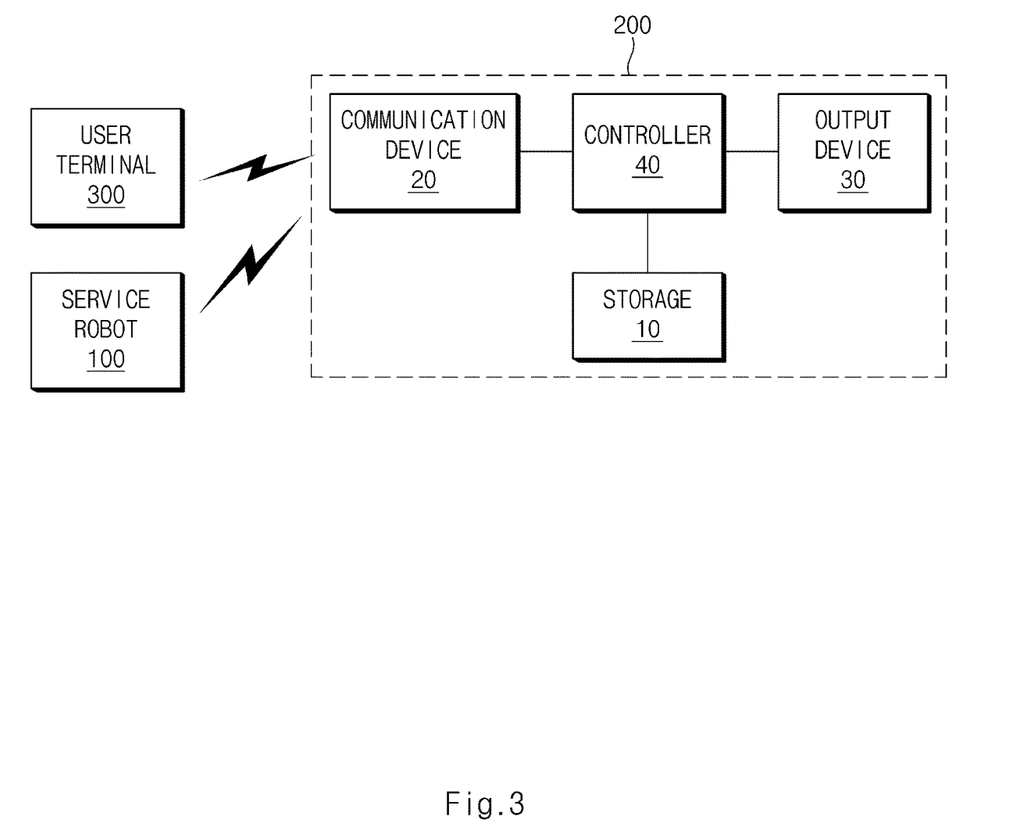
FIG. 3 is a block diagram illustrating a device for controlling a service robot, according to an embodiment of the present disclosure.

FIG. 3 is a block diagram illustrating a device for controlling a service robot, according to an embodiment of the present disclosure.

As illustrated in FIG. 3, according to an embodiment of the present disclosure, a device 200 for controlling a service robot may include a storage 10, a communication device 20, an output device 30, and a controller 40. In this case, according to an embodiment of the present disclosure, the components may be combined into each other to be implemented in one form, or some components may be omitted, depending on the manners of reproducing the device 200 for controlling the service robot. In this case, the device 200 for controlling the service robot may be implemented in the form of a server.

Regarding the components, first, the storage 10 may store various logics, various algorithms, and various programs required in the process of providing an editing function for various scenarios applied to the service robot, to the user, of determining a task appropriate to the situation of the service robot 100, and of performing a behavior corresponding to the task and an action corresponding to the behavior, through the interaction among the task planner 41, the behavior manager 42, and the action arbiter 171.

The storage 10 may include at least one storage medium of a memory in a flash memory type, a hard disk type, a micro type, the type of a card (e.g., a security digital (SD) card or an eXtreme digital (XD) card), a random access memory (RAM), a static RAM (SRAM), a read only memory (ROM), a programmable ROM (PROM), an electrically erasable and programmable ROM (EEPROM), a magnetic RAM (MRAM), a magnetic disk-type memory, or an optical disk-type memory.

The communication device 20 may provide a communication interface with the user terminal 300 and may provide a communication interface with the service robot 100. For reference, when the device 200 for controlling the service robot is mounted on the service robot 100, the communication device 20 may perform inter-process communication (IPC).

The communication device 20 may include at least one of a mobile communication module, a wireless Internet module, or a short-range wireless communication module.

The mobile communication module may make communication with the user terminal 300 and the service robot 100 over a mobile communication network constructed depending on technology standards for mobile communication or communication schemes (for example, global system for mobile communication (GSM), code division multi access (CDMA), code division multi access 2000 (CDMA 2000), enhanced voice-data optimized or enhanced voice-data only (EV-DO), wideband CDMA (WCDMA), high speed downlink packet access (HSDPA), high speed uplink packet access (HSUPA), long term evolution (LTE), or long term evolution-advanced (LTEA)) for mobile communication.

The wireless Internet module, which is a module for wireless Internet access, may make communication with the user terminal 300 and the service robot 100 through wireless LAN (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), or long term evolution-advanced (LTE-A).

The short-range communication module may support short-range communication with the user terminal 300 and the service robot 100 through at least one of Bluetooth™, radio frequency identification (RFID), infrared data association (IrDA), ultra wideband (UWB), ZigBee, near field communication (NFC), or wireless universal serial bus (USB).

The output device 30 may output a screen involved in the process of generating a scenario and changing the scenario, and may output various types of information received from the service robot 100.

The controller 40 may perform the overall control such that the components normally perform the respective functions. In addition, the controller 40 may be implemented in the form of hardware or software, and may be implemented in the form of the combination of the hardware and the software. Preferably, the controller 40 may be implemented in the form of a micro-processor, but the present disclosure is not limited thereto.

The controller 40 may be implemented in the form of one processor that performs both the function of the task planner 41 and the function of the behavior manager 42, or in the form of a first processor to perform the function of the task planner 41 and a second processor to perform the function of the behavior manager 42.

The controller 40 may perform various control operations of providing an editing function for various scenarios applied to the service robot, to the user, of determining a task appropriate to the situation of the service robot 100, and of performing a behavior corresponding to the task and an action corresponding to the behavior, through the interaction among the task planner 41, the behavior manager 42, and the action arbiter 171.

The controller 40 may authenticate the connection of the user terminal 300 and may provide the scenario editing function to the user terminal 300 which has been legitimately authenticated. For reference, a scenario refers to a command group in which a behavior list is matched to correspond to each task, and at least one action is matched to each behavior. In this case, the actions are synchronized with each other.

The controller 40 may acquire various pieces of sensor information from the sensor 120 provided in the service robot 100, detect a situation of the service robot 100 based on the sensor information, and determine a task appropriate to the detected situation of the service robot 100.

The controller 40 determines a task corresponding to a present situation of the service robot 100, searches the task repository 11 for a behavior list corresponding to the task, and sequentially transmits each behavior on the behavior list to the behavior manager 42. In this case, when finishing the behavior received from the task planner 41, the behavior manager 42 transmits the behavior finish message to the task planner 41. When receiving the behavior finish message from the behavior manager 42, the task planner 41 transmits a next behavior to the behavior manager 42.

The controller 40 may control the service robot 100 based on an action set for each of behaviors constituting the task. In this case, the controller 40 may control the service robot 100, based on an action set corresponding to a next behavior, when the control operation for the action set corresponding to one behavior is finished.

Figure 4:
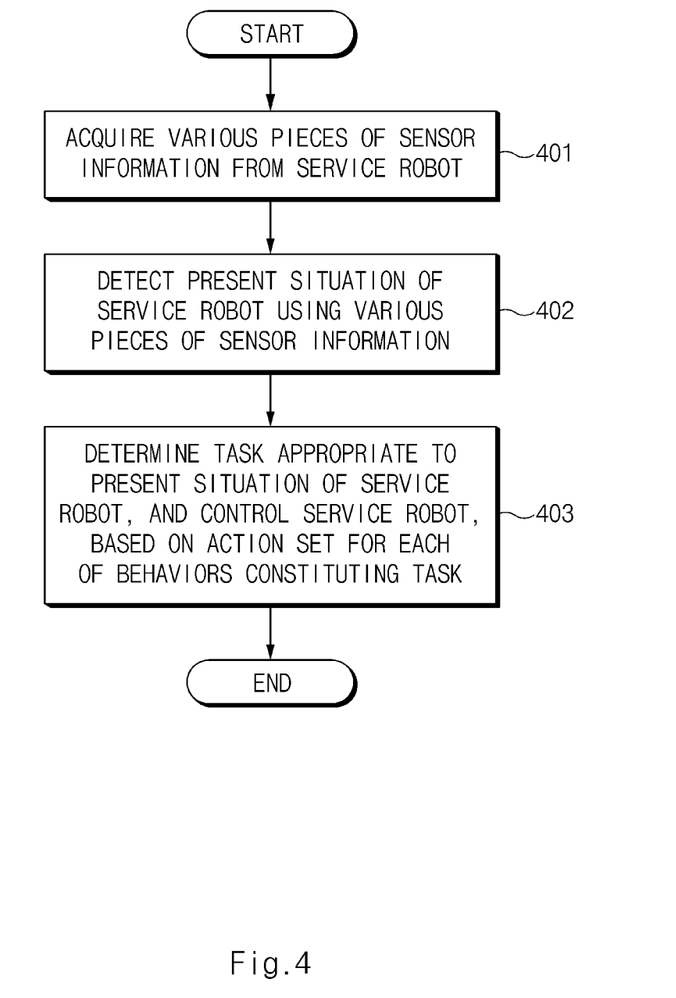
FIG. 4 is a flowchart illustrating a method for controlling a service robot, according to an embodiment of the present disclosure.

FIG. 4 is a flowchart illustrating a method for controlling a service robot, according to an embodiment of the present disclosure.

First, the controller 40 acquires various pieces of sensor information from the service robot 100 (401).

Thereafter, the controller 40 detects the present situation of the service robot 100 by using the various pieces of sensor information (402).

Thereafter, the controller 40 determines a task appropriate to the present situation of the service robot 100, and controls the service robot 100, based on an action set for each of behaviors constituting the task (403).

Figure 5:
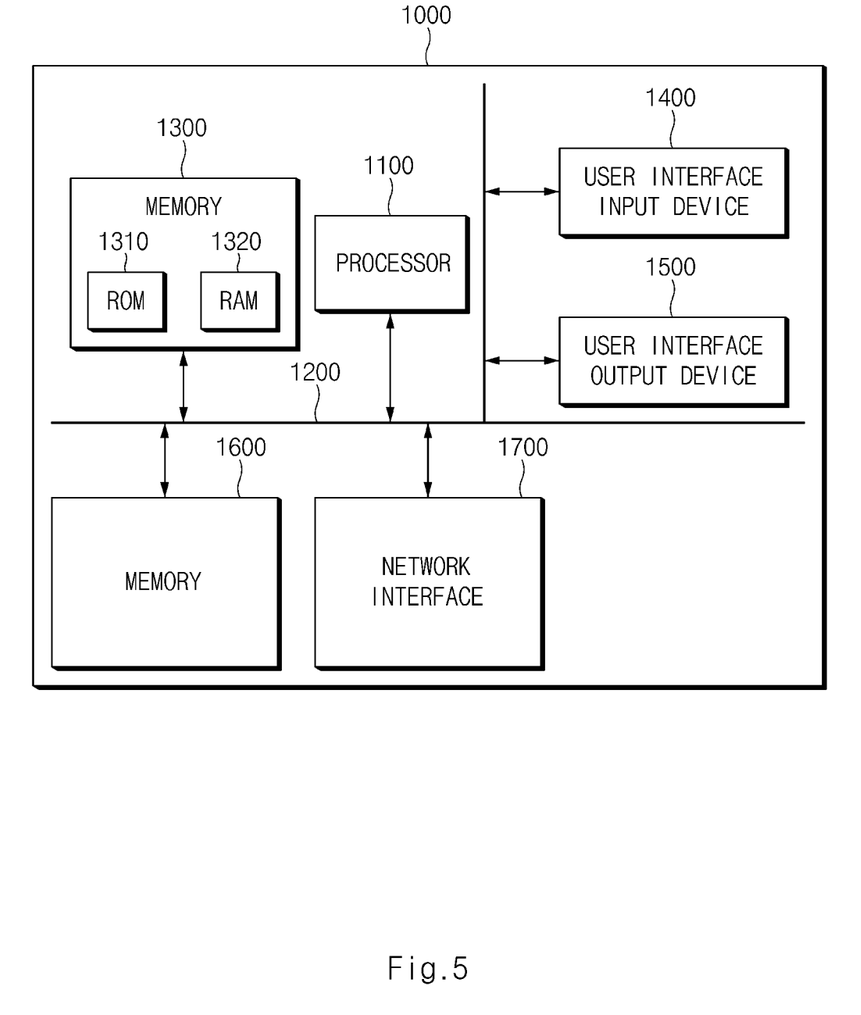
FIG. 5 is a block diagram illustrating a computing system to execute a method for controlling a service robot, according to an embodiment of the present disclosure.

FIG. 5 is a block diagram illustrating a computing system to execute a method for controlling a service robot, according to an embodiment of the present disclosure.

Referring to FIG. 5, according to an embodiment of the present disclosure, the method for controlling the service robot may be implemented through a computing system. A computing system 1000 may include at least one processor 1100, a memory 1300, a user interface input device 1400, a user interface output device 1500, a memory (i.e., a storage) 1600, and a network interface 1700, which are connected with each other through a system bus 1200.

The processor 1100 may be a central processing unit (CPU) or a semiconductor device for processing instructions stored in the memory 1300 and/or the memory 1600. Each of the memory 1300 and the memory 1600 may include various types of volatile or non-volatile storage media. For example, the memory 1300 may include a read only memory (ROM) 1310 and a random access memory (RAM) 1320.

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the memory 1600), such as a RAM, a flash memory, a ROM, an erasable and programmable ROM (EPROM), an electrically EPROM (EEPROM), a register, a hard disc, a solid state drive (SSD), a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, in the service robot system and the method for operating the same according to an embodiment of the present disclosure, the various scenarios applied to the service robot may be easily changed, and the service robot may be normally operated even if the scenario is changed by the user, by providing an editing function for various scenarios applied to the service robot, to the user, determining a task appropriate to the situation of the service robot, and performing a behavior corresponding to the task and an action corresponding to the behavior, through the interaction among the task planner, the behavior manager, and the action arbiter.

The above description is merely an example of the technical idea of the present disclosure, and various modifications and modifications may be made by one skilled in the art without departing from the essential characteristic of the disclosure.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be construed by the attached claims, and all equivalents thereof should be construed as being included within the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling a service robot, the device comprising:
   a communication device configured to communicate with the service robot; and
   a controller configured to:
   detect a present situation of the service robot by using various pieces of sensor information acquired from the service robot;
   determine a task appropriate to the present situation of the service robot, wherein the task comprises one or more behaviors; and
   control the service robot based on an action set for each of the one or more behaviors of the task.

2. The device of claim 1, wherein the controller is configured to provide an editing function for a scenario applied to the service robot.

3. The device of claim 2, wherein the controller is configured to generate a behavior list corresponding to each task and match at least one action to a behavior on the behavior list, for the editing function for the scenario.

4. The device of claim 1, wherein the service robot comprises an action arbiter configured to drive the service robot in conjunction with a hardware ablation layer.

5. The device of claim 4, wherein the action arbiter comprises an action repository configured to store actions corresponding to the one or more behaviors.

6. The device of claim 4, wherein the controller comprises:
   a task repository configured to store a behavior list corresponding to each task;

a task planner configured to determine the task corresponding to the present situation of the service robot and search the task repository for the behavior list corresponding to the task; and a behavior manager configured to transmit, to the action arbiter, an action set corresponding to the behavior received from the task planner.

7. The device of claim 6, wherein the task planner is configured to transmit a next behavior to the behavior manager, after a determination that the behavior transmitted to the behavior manager has been performed by the service robot.

8. The device of claim 6, wherein the behavior manager is configured to transmit, to the action arbiter, an action set for the next behavior, after a determination that the action set corresponding to the behavior received from the task planner has been performed by the service robot.

9. The device of claim 6, wherein the behavior manager is configured to adjust synchronization between actions included in the action set.

10. The device of claim 6, wherein the action arbiter is configured to drive the service robot based on the action set received from the behavior manager.

11. A method for controlling a service robot, the method comprising:
    acquiring various pieces of sensor information from the service robot;
    detecting a present situation of the service robot using the various pieces of sensor information;
    determining a task appropriate to the present situation of the service robot, wherein the task comprises one or more behaviors; and
    controlling the service robot based on an action set for each of the one or more behaviors of the task.

12. The method of claim 11, further comprising providing an editing function for a scenario applied to the service robot.

13. The method of claim 12, wherein providing the editing function for the scenario comprises:
    generating a behavior list corresponding to each task; and
    matching at least one action to each behavior on the behavior list.

14. The method of claim 11, wherein the service robot comprises an action arbiter that drives the service robot in conjunction with a hardware ablation layer.

15. The method of claim 14, wherein the action arbiter comprises an action repository that stores actions related to the behavior.

16. The method of claim 14, wherein controlling the service robot comprises:
    determining, by a task planner comprising a task repository that stores a behavior list corresponding to the task, the task corresponding to the present situation of the service robot, searching the task repository for the behavior list corresponding to the task, and transmitting a behavior on the behavior list to a behavior manager; and
    transmitting, by the behavior manager, to the action arbiter, an action set corresponding to the behavior received from the task planner.

17. The method of claim 16, wherein transmitting the behavior on the behavior list to the behavior manager comprises transmitting, by the task planner, a next behavior to the behavior manager, after determining that the behavior transmitted to the behavior manager has been performed by the service robot.

18. The method of claim 16, wherein transmitting the action set to the action arbiter comprises transmitting, by the behavior manager, an action set for the next behavior to the action arbiter, after determining that the action set corresponding to the behavior received from the task planner has been performed by the service robot.

19. The method of claim 16, wherein transmitting the action set to the action arbiter comprises adjusting synchronization between actions included in the action set.

20. The method of claim 16, wherein controlling the service robot comprises driving the service robot based on the action set received from the behavior manager.

* * * * *

UNITED STATES PATENT AND TRADEMARK OFFICE
CERTIFICATE OF CORRECTION

| | | |
|---|---|---|
| PATENT NO. | : 12,128,544 B2 | Page 1 of 1 |
| APPLICATION NO. | : 17/847508 | |
| DATED | : October 29, 2024 | |
| INVENTOR(S) | : Hwang et al. | |

It is certified that error appears in the above-identified patent and that said Letters Patent is hereby corrected as shown below:

On the Title Page

In Column 1, under "Prior Publication Data", Line 1:
Below "US 2023/0202049 A1 Jun 29, 2023"
Insert -- (30) Foreign Application Priority Data
Dec. 24, 2021 (KR) .................. 10-2021-0187799 --.

Signed and Sealed this
Tenth Day of December, 2024

Katherine Kelly Vidal
*Director of the United States Patent and Trademark Office*